(12) United States Patent
Takamine et al.

(10) Patent No.: US 10,883,919 B2
(45) Date of Patent: Jan. 5, 2021

(54) STRUCTURE EVALUATION SYSTEM AND STRUCTURE EVALUATION METHOD

(71) Applicants: Kabushiki Kaisha Toshiba, Minato-ku (JP); Kyoto University, Kyoto (JP)

(72) Inventors: Hidefumi Takamine, Shinagawa (JP); Kazuo Watabe, Yokohama (JP); Tomoki Shiotani, Kyoto (JP); Takahiro Nishida, Kyoto (JP)

(73) Assignees: Kabushiki Kaisha Toshiba, Minato-ku (JP); Kyoto University, Kyoto (JP)

( * ) Notice: Subject to any disclaimer, the term of this patent is extended or adjusted under 35 U.S.C. 154(b) by 213 days.

(21) Appl. No.: 15/918,549

(22) Filed: Mar. 12, 2018

(65) Prior Publication Data
US 2018/0372580 A1    Dec. 27, 2018

Related U.S. Application Data

(63) Continuation of application No. PCT/JP2017/022856, filed on Jun. 21, 2017.

(51) Int. Cl.
*G01N 19/08* (2006.01)
*G01M 99/00* (2011.01)
(Continued)

(52) U.S. Cl.
CPC ............ *G01N 19/08* (2013.01); *G01M 99/00* (2013.01); *G01N 29/045* (2013.01); *G01H 1/12* (2013.01);
(Continued)

(58) Field of Classification Search
CPC ..... G01M 7/08; G01H 1/12–16; G01N 29/14; G01N 29/045
See application file for complete search history.

(56) References Cited

U.S. PATENT DOCUMENTS 4,979,125 A * 12/1990 Kwun .................... B65H 63/06
702/35
5,165,270 A * 11/1992 Sansalone ................ G01N 3/30
73/12.08
(Continued)

FOREIGN PATENT DOCUMENTS

JP       10-090235       4/1998
JP       2004-125721     4/2004
(Continued)

OTHER PUBLICATIONS

International Search Report dated Sep. 19, 2017 in PCT/JP2017/022856 filed Jun. 21, 2017 (with English Translation of Categories of Cited Documents).
(Continued)

*Primary Examiner* — Alexander A Mercado
(74) *Attorney, Agent, or Firm* — Oblon, McClelland, Maier & Neustadt, L.L.P.

(57) ABSTRACT

According to one embodiment, a structure evaluation system includes an impact imparting unit, a sensor, and a structure evaluation device. The impact imparting unit applies impacts to a structure. The impact imparting unit applies the impacts at a frequency equal to or less than a frequency determined in accordance with an intensity at which the impacts are imparted. The sensor detects elastic waves. The structure evaluation device evaluates a deterioration state of the structure on the basis of the detected elastic waves.

13 Claims, 5 Drawing Sheets

(51) Int. Cl.
*G01N 29/04* (2006.01)
*G01H 1/12* (2006.01)
*G01M 5/00* (2006.01)
*G01M 7/08* (2006.01)

(52) U.S. Cl.
CPC ............ *G01M 5/0066* (2013.01); *G01M 7/08* (2013.01); *G01N 29/046* (2013.01)

(56) References Cited

U.S. PATENT DOCUMENTS

| | | | | |
|---|---|---|---|---|
| 5,214,960 | A * | 6/1993 | Tsuboi | G01H 1/14 702/39 |
| 5,528,557 | A * | 6/1996 | Horn | G01N 29/14 367/118 |
| 5,614,670 | A * | 3/1997 | Nazarian | E01C 23/00 73/146 |
| 5,996,413 | A * | 12/1999 | Iyer | G01N 29/045 73/592 |
| 6,257,064 | B1 * | 7/2001 | Duron | G01N 29/045 73/594 |
| 6,813,927 | B1 * | 11/2004 | Harris | G01N 33/46 73/12.12 |
| 9,261,444 | B1 * | 2/2016 | Sutherland | G01N 3/02 |
| 10,495,556 | B2 * | 12/2019 | Rust | G01N 3/36 |
| 2004/0147841 | A1 * | 7/2004 | McLaughlin | A61B 8/08 600/437 |
| 2005/0072234 | A1 * | 4/2005 | Zhu | G01H 1/00 73/579 |
| 2010/0307248 | A1 * | 12/2010 | Hayashi | G01N 29/12 73/579 |
| 2012/0151989 | A1 * | 6/2012 | Knox | G01M 7/08 73/12.04 |
| 2013/0024136 | A1 * | 1/2013 | Gallippi | A61B 8/485 702/41 |
| 2013/0191040 | A1 * | 7/2013 | Yoon | G01N 29/069 702/36 |
| 2013/0298690 | A1 * | 11/2013 | Bond | G01L 5/0052 73/788 |
| 2016/0282310 | A1 * | 9/2016 | Usui | G01N 29/4436 |
| 2017/0363586 | A1 | 12/2017 | Takamine et al. | |
| 2018/0113095 | A1 * | 4/2018 | Chaffee | G01N 29/04 |
| 2018/0209943 | A1 * | 7/2018 | Safai | G01N 29/24 |
| 2018/0266998 | A1 * | 9/2018 | Takamine | G01N 29/14 |
| 2019/0003945 | A1 * | 1/2019 | Rust | G01B 3/08 |

FOREIGN PATENT DOCUMENTS

| | | |
|---|---|---|
| JP | 2013-044523 | 3/2013 |
| JP | 2013-205287 | 10/2013 |
| JP | 2014-202682 | 10/2014 |
| WO | WO 2017/217034 A1 | 12/2017 |

OTHER PUBLICATIONS

Written Opinion dated Sep. 19, 2017 in PCT/JP2017/022856 filed Jun. 21, 2017.

* cited by examiner

STRUCTURE EVALUATION SYSTEM AND STRUCTURE EVALUATION METHOD

CROSS-REFERENCE TO RELATED APPLICATION

This is a Continuation Application of International Application PCT/JP2017/022856, filed on Jun. 21, 2017, and the entire contents of all of which are incorporated herein by reference.

FIELD

Embodiments described herein relate generally to a structure evaluation system and a structure evaluation method.

BACKGROUND

Elastic waves generated from damaged places and the like inside a structure can be detected by installing a sensor such as an AE sensor on a surface of the structure such as a bridge. Moreover, it is possible to locate a position of the generation source of elastic waves (hereinafter, referred to as "elastic wave generation source") based on a difference in arrival time of elastic waves between sensors by installing a plurality of sensors. Similar elastic waves are generated by collision of raindrops onto a road surface during rainfall, and the like, and it is possible to locate a generation position of the elastic waves. However, when there is damage on the propagation path of the elastic waves, propagation of the elastic waves is hindered, and thereby it is not possible to correctly locate the generation position. By using this, damages inside the structure can be detected based on disturbance to the distribution of elastic wave generation sources whose positions are located. However, it may be difficult to efficiently perform intended measurement in a method using only rainfall in some cases.

DETAILED DESCRIPTION

The present invention provides a structure evaluation system and a structure evaluation method which can efficiently perform measurement.

According to one embodiment, a structure evaluation system includes an impact imparting unit, a sensor, and a structure evaluation device. The impact imparting unit applies impacts to a structure. The impact imparting unit applies the impacts at a frequency equal to or less than a frequency determined according to an intensity at which the impact are imparted. The sensor detects elastic waves. The structure evaluation device evaluates a deterioration state of the structure on the basis of the detected elastic waves.

Figure 1:
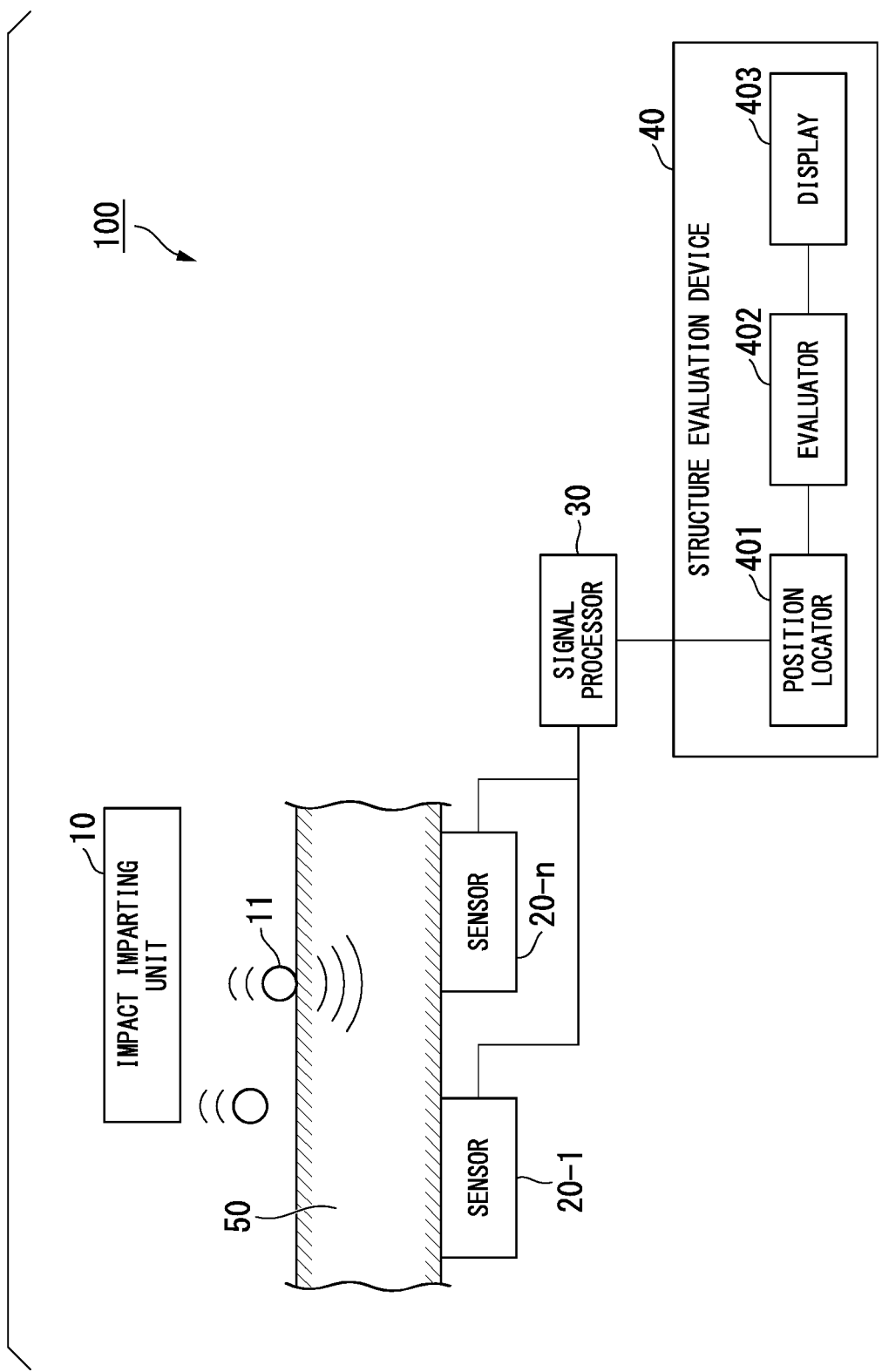
FIG. 1 is a diagram which shows a system configuration of a structure evaluation system according to an embodiment.

Hereinafter, a structure evaluation system and a structure evaluation method of an embodiment will be described with reference to drawings. FIG. 1 is a diagram which shows a system configuration of a structure evaluation system 100 of the embodiment. The structure evaluation system 100 is used for an evaluation of the soundness of a structure. In the present embodiment, evaluation means to determine the degree of soundness of a structure, that is, the deterioration state of a structure, on the basis of a certain reference. In the present embodiment, a bridge is taken as an example of a structure, but the structure is not necessarily limited to the bridge. For example, the structure may be any structure as long as elastic waves are generated due to the occurrence or development of cracks or external impacts (for example, rain, artificial rain, and the like). The bridge is not limited to a structure that is laid over a river, a valley, or the like, but also includes various structures (for example, a highway crossing on highways) provided above the ground, and the like.

The structure evaluation system 100 includes an impact imparting unit 10, a plurality of sensors 20-1 to 20-$n$ ($n$ is an integer of two or more), a signal processor 30, and a structure evaluation device 40. The signal processor 30 and the structure evaluation device 40 are connected to be able to communicate with each other in a wired or wireless manner. In the following description, sensors 20-1 to 20-$n$ will be described as a sensor 20 when there is no distinction there between.

The impact imparting unit 10 applies impacts 11 to a structure 50, and generates elastic waves. The impact imparting unit 10 is provided in, for example, a conveyance such as a vehicle running on the structure 50. The impact imparting unit 10 imparts a plurality of impacts 11 to a road surface of the structure 50. Impacts 11 imparted by the impact imparting unit 10 are preferably imparted with a uniform distribution in a measurement area. The impartation of impacts 11 is performed by, for example, spraying of water droplets, ice particles, or solid matter, repeated hammering with a hammer and the like, heating by a laser, and the like. When the impact imparting unit 10 sprays water droplets as the impartation of impacts 11, it is desirable to control the size and timing of water droplets colliding with the road surface by adjusting a nozzle and controlling discharge timings. It is also desirable to control the intensity and timings of impacts 11 such that they have desired values also with the repeated hammering with a hammer and the like. These impacts 11 are imparted so as to satisfy the conditions to be described below. A specific description will be provided below.

The sensor 20 is installed in the structure 50. For example, the sensor 20 may be installed on a surface opposite to a surface to which the impact imparting unit 10 applies impacts 11. The sensor 20 has a piezoelectric element, detects elastic waves generated by the structure 50, and converts the detected elastic waves into an AE source signal which is a voltage signal. The sensor 20 performs processing such as amplification and frequency limitation on the AE source signal, and outputs results to the signal processor 30. An acceleration sensor may be used instead of the sensor 20. In this case, the acceleration sensor outputs a signal obtained after signal processing to the signal processor 30 by performing the same processing as the sensor 20. The thickness of the structure 50 is, for example, 15 cm or more.

The signal processor 30 receives the AE source signal subjected to the processing performed by the sensor 20 as an input. The signal processor 30 extracts an AE feature amount including information on elastic waves by performing signal processing such as necessary noise removal and parameter extraction on the input AE source signal. The information on elastic waves is, for example, information on the amplitude, energy, rising time, duration, frequency, zero crossing count number, and the like of the AE source signal. The signal processor 30 outputs information based on the extracted AE feature amount to the structure evaluation device 40 as an AE signal. The AE signal output by the signal processor 30 includes information on a sensor ID, an AE detection time, and an amplitude, energy, rising time, frequency, and the like of the AE source signal.

Here, the amplitude of the AE source signal is, for example, a value of the maximum amplitude in the elastic waves. The energy is, for example, a value obtained by time-integrating squared amplitudes at respective times. The definition of energy is not limited to the above example, and may be, for example, a definition approximated by using the envelop curve of a waveform. The rising time is, for example, a time from when the elastic waves exceed a predetermined value set in advance to when the amplitude reaches a peak. The duration is, for example, a time from when the elastic waves start to rise to when the amplitude is less than a value set in advance. The frequency is the frequency of the elastic waves. The zero crossing count number is the number of times the elastic waves traverse a reference line through a zero value, for example.

The structure evaluation device 40 includes a central processing unit (CPU), a memory, an auxiliary storage device, and the like connected by a bus, and executes an evaluation program. The structure evaluation device 40 functions as a device including a position locator 401, an evaluator 402, and a display 403 by executing the evaluation program. All or some of respective functions of the structure evaluation device 40 may be realized by using hardware such as an application specific integrated circuit (ASIC), a programmable logic device (PLD), or a field programmable gate array (FPGA). In addition, the evaluation program may be recorded in a computer-readable recording medium. The computer-readable recording medium is, for example, a portable medium such as a flexible disk, a magnetic-optical disc, a ROM, and a CD-ROM, or a storage device such as a hard disk embedded in a computer system. In addition, the evaluation program may also be transmitted or received through an electrical communication line.

The position locator 401 receives the AE signal output from the signal processor 30 as an input. In addition, the position locator 401 holds information on the installation position of the sensor 20 in the structure 50 (hereinafter, referred to as "sensor position information") in correlation with a sensor ID in advance. The information on the installation position is, for example, a latitude and longitude, distances from a specific position of the structure 50 in a horizontal direction and a vertical direction, or the like.

The position locator 401 performs position location of an elastic wave generation source on the basis of an sensor ID included in the input AE signal, information on an AE detection time and the like and the sensor position information held in advance. For example, the position locator 401 may perform the position location of each elastic wave generation source by using a plurality of AE signals according to the impacts 11 onto the structure 50. In addition, the position locator 401 may derive a generation source distribution by using results of the position location. The generation source distribution is a distribution showing the generation source of elastic waves generated in the structure 50. The position locator 401 outputs the derived generation source distribution to the evaluator 402.

The evaluator 402 receives the generation source distribution output from the position locator 401 as an input. The evaluator 402 evaluates the deterioration state of the structure 50 on the basis of the input generation source distribution. For example, the evaluator 402 may evaluate the deterioration state of the structure 50 based on a feature amount of elastic waves in the generation source distribution. The feature amount of elastic waves in the generation source distribution corresponds to the density of an elastic wave generation source. As specific processing, the evaluator 402 may evaluate a region in which the density of an elastic wave generation source is less than a first threshold value as a region in which the degradation of the structure 50 occurs on the basis of the generation source distribution. The density of an elastic wave generation source, for example, may be obtained for each area enclosed by three sensors 20, may be obtained for each area enclosed by four sensors 20, and may be obtained for each area obtained by dividing the generation source distribution into areas determined in advance. The evaluator 402 displays a result of the evaluation on the display 403. The first threshold value may be set in advance, and may also be appropriately set.

The display 403 is an image display device such as a liquid crystal display and an organic electro luminescence (EL) display. The display 403 displays a result of the evaluation according to the control of the evaluator 402. The display 403 may also be an interface for connecting the image display device to the structure evaluation device 40. In this case, the display 403 generates a video signal for displaying a result of the evaluation and outputs the video signal to the image display device connected to the display 403.

Next, a condition to be satisfied by impacts 11 imparted to the structure 50 by the impact imparting unit 10 will be described. If an interval between impacts 11 which the impact imparting unit 10 applies to the structure 50 is too long, it takes a long time to apply a large number of impacts 11. On the other hand, if the interval between impacts 11 which the impact imparting unit 10 applies to the structure 50 is too short, it may not be possible to separate elastic waves generated by an impact 11 applied immediately before from elastic waves generated by an impact 11 applied at a current time. For this reason, the number of elastic waves detected with respect to the number of applied impacts 11 are reduced. Therefore, it is necessary to optimize the intensity and timing at which the impacts 11 are imparted to the structure 50 so as to efficiently realize evaluation of the deterioration state.

In general, since an elastic wave having a greater amplitude reaching the sensor 20 has a better S/N for an obtained signal and has improved accuracy in position location, it is desirable to impart the strongest possible impact 11. In addition, it is desirable to impart impacts 11 at short time intervals and to detect more signals within a certain period of time to efficiently evaluate the deterioration state of the structure 50 in a short period of time. Therefore, it is desirable that a signal amplitude A [dB] detected by the sensor 20 be large, and it is desirable that an interval T [ms] at which impacts 11 are applied be small.

On the other hand, it is necessary to capture the rising of an elastic wave waveform on a sensor 20 side to locate the position of an elastic wave generation source. However, since elastic waves continuously generated overlap and cannot be separated if T [ms] is too small, the sensor 20 cannot capture the rising of elastic waves generated by a subsequent impact 11. Therefore, if the duration of elastic waves detected by the sensor 20 is set to D [ms], it is necessary to impart a next impact 11 with at least an interval D [ms] after the impartation of a previous impact to separate the elastic waves caused by an individual impact 11.

Figure 2:
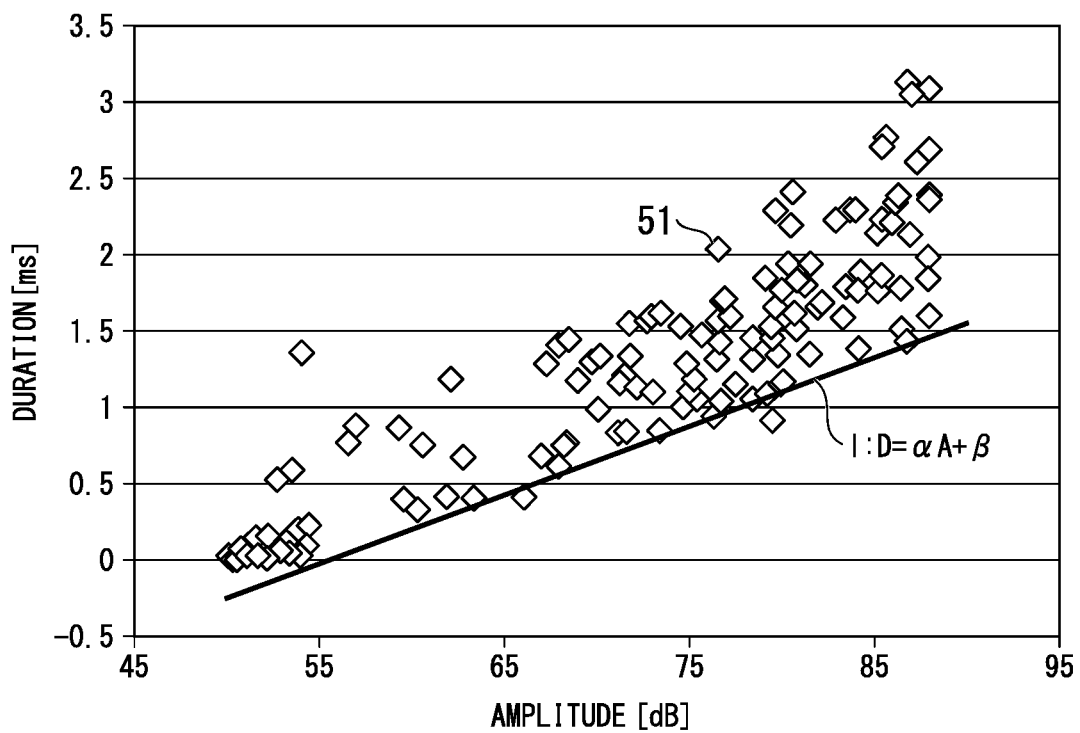
FIG. 2 is a diagram which represents a relationship between a signal amplitude and duration according to an embodiment.

FIG. 2 is a diagram which represents a relationship between a signal amplitude A [dB] and the duration D [ms] when the sensor 20 is installed in a concrete specimen as the structure 50 and elastic waves generated by giving a plurality of impacts 11 to the concrete specimen are detected. In FIG. 2, the vertical axis represents the duration [ms] and the horizontal axis represents the amplitude [dB]. The duration represents a time over which elastic waves are continuously detected. As the impact imparted is stronger, it takes more time for elastic waves echoing in the structure 50 to be attenuated, and thus the amplitude A [dB] and the duration D [ms] are generally proportional to each other. In addition, a point 51 shown in FIG. 2 represents a detected elastic wave.

When impacts 11 are applied below each point 51 shown in FIG. 2, that is, impacts 11 are applied at shorter intervals with the same intensity, or when impacts 11 are applied on the right side of each point 51, that is, impacts 11 are applied at the same interval with a higher intensity, elastic waves caused by the impacts 11 overlap elastic waves generated immediately before and cannot be separated therefrom. Therefore, it is necessary to provide an appropriate straight line l:D=αA+β and to apply impacts 11 under conditions of being above this straight line l to separate the elastic waves generated immediately before and detect it in the sensor 20. Therefore, the conditions that the impact imparting interval T [ms] needs to satisfy are represented by Equation 1.

[Math. 1]

$$T \geq \alpha A + \beta \quad (1)$$

Figure 3:
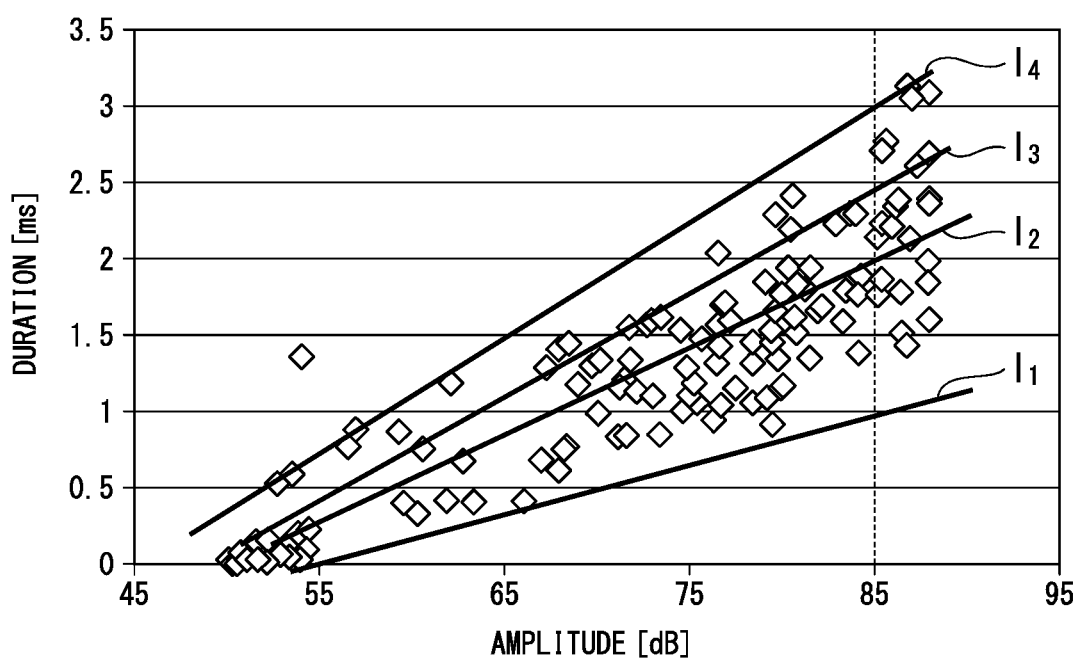
FIG. 3 is a diagram for describing setting of a straight line 1.

The setting of the straight line l will be described. FIG. 3 is a diagram for describing the setting of the straight line l. In FIG. 3, the vertical axis represents the duration [ms], and the horizontal axis represents the amplitude [dB]. A plurality of straight lines $l_1$, $l_2$, $l_3$, and $l_4$ are shown in FIG. 3. There are almost no points below a straight line $l_1$ (α=0.036, β=−2.0). This means that elastic waves having shorter duration than those on the straight line $l_1$ are not detected, and, when an impact 11 is applied under conditions corresponding to being below the straight line $l_1$, elastic waves generated immediately before and elastic waves subsequently generated necessarily overlap and cannot be separated. Therefore, the impact imparting unit 10 needs to apply an impact 11 under conditions of being above a minimum straight line $l_1$ to separate and detect at least one or more elastic waves.

The impact imparting interval T needs to satisfy at least the conditions of being above the straight line $l_1$, but it is more preferable to use another straight line as a reference. When the straight line $l_1$ is used as a reference, there are elastic waves which do not overlap elastic waves generated immediately before, but most elastic waves overlap the elastic waves generated immediately before, and thus measurement efficiency is not that high. Therefore, using, for example, an approximate straight line $l_2$ (α=0.057, β=−2.9) obtained by a least squares method as a reference, although the interval between impacts 11 can be longer, a proportion of elastic waves which overlap elastic waves generated immediately before decreases, and thus it is possible to improve the efficiency compared with using the straight line $l_1$ as a reference.

In addition, when a straight line $l_4$ (α=0.074, β=−3.4) corresponding to near the upper limit of distribution is used as a reference, although intervals between which impacts 11 are applied becomes longer than using $l_1$ and $l_2$ as a reference, but there are almost no elastic waves overlapping elastic waves generated immediately before, and thus it is possible to improve the efficiency compared with using the straight line $l_1$ as a reference.

Figure 4:
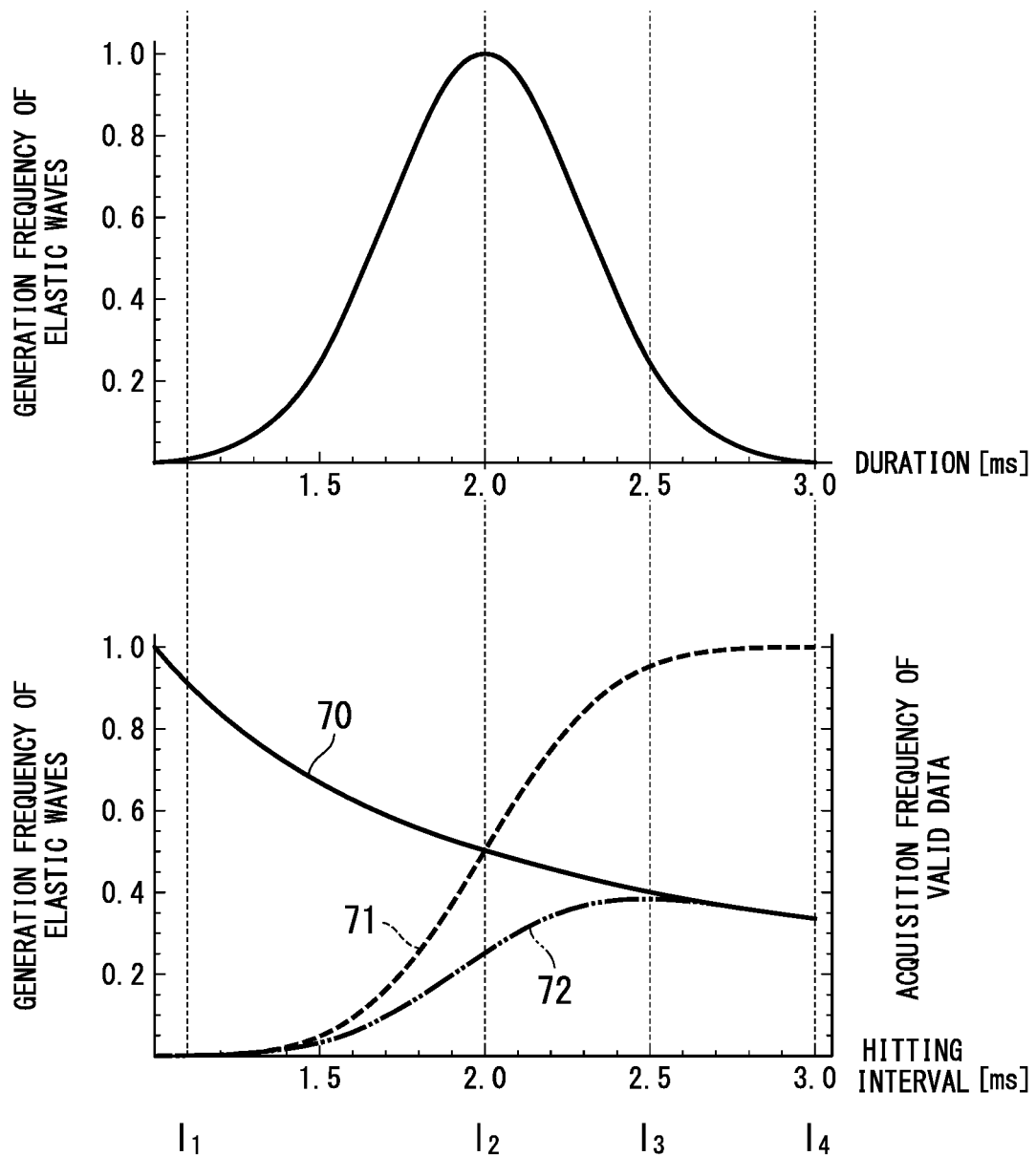
FIG. 4 is a diagram which represents distribution of duration in the vicinity of an amplitude A=85 dB of FIG. 3, and a method of obtaining a position of an optimum straight line.

More desirably, a straight line $l_3$ derived from the relationship between the proportion of elastic waves overlap in elastic waves generated immediately before and the impact imparting interval T can be taken as a reference. FIG. 4 is a diagram which represents a distribution of the duration D in the vicinity of an amplitude A=85 dB of FIG. 3, and a method of obtaining a position of an optimum straight line. It is assumed that the distribution of elastic waves at each amplitude as shown in the graph of FIG. 4. The vertical axis on the left side of the lower graph in FIG. 4 represents the frequency of occurrence of elastic waves, the vertical axis on the right side represents the acquisition frequency of valid data, and the horizontal axis represents a hitting interval when the straight line l set as a reference is changed.

When the impact imparting unit 10 applies impacts 11 at a frequency corresponding to the straight line l, the frequency of impact impartation is represented by a curve 70. Since elastic waves having the duration D shorter than those on the straight line l do not overlap elastic waves generated immediately before, a proportion of elastic waves detected to be valid is a proportion of the normal distribution up to the position of the straight line l, and is represented by a curve 71. That is, the curve 71 represents a proportion of separable elastic waves. An efficiency with which the waveform can be acquired is obtained by multiplying the frequency of impacts 11 by a proportion of elastic waves which do not overlap elastic waves generated immediately before, and is represented by a curve 72. That is, the curve 72 represents the acquisition frequency of valid data, and is a value obtained by multiplying the curve 70 by the curve 71. A point that this curve 72 takes as a maximum value means a maximum efficiency point. In this case, the impact imparting unit 10 can apply impacts 11 more efficiently by setting the straight line $l_3$ (α=0.066, β=−3.2) as a limit.

The above is an example related to the concrete specimen shown in FIGS. 2 to 4, in which it is possible to set the straight line l in the same procedure as giving experimental impacts 11 in accordance with a measurement object, acquiring elastic wave signals, and creating a D-A distribution as shown in FIG. 2. In addition, it is not absolutely necessary to create a D-A distribution on a measurement object itself, and it is possible to set the straight line l on the basis of a similar specimen or a D-A distribution in a similar case.

Figure 5:
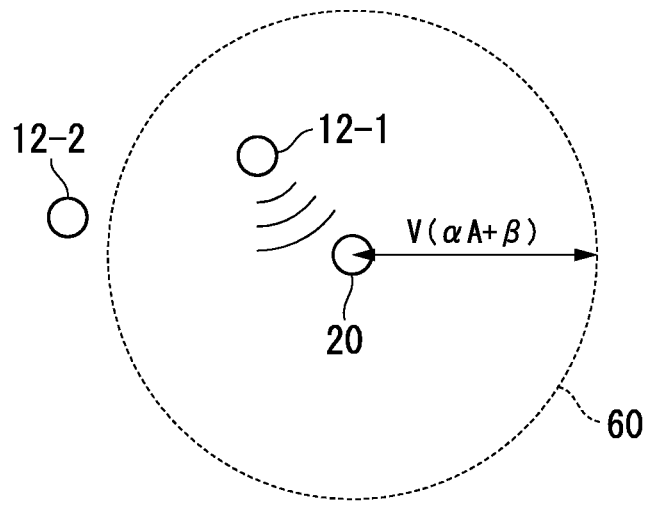
FIG. 5 is a diagram which describes a configuration in which an influence is alleviated when a plurality of impacts are applied.

The condition shown in Equation (1) can be attenuated by moving a position at which a next impact 11 is applied far away. The outline is shown in FIG. 5. When the impact imparting unit 10 applies impacts 11 of an intensity detected at a sufficiently strong amplitude A in the sensor 20, if elastic waves caused by this impact 11 have an elastic wave velocity in the measurement object set as V, the elastic waves reach the sensor 20 approximately within a distance at which V [mm/ms] D [ms] is V(αA+β) [mm] while maintaining an amplitude at which the impacts 11 can be detected.

Elastic waves caused by a first impact reach the sensor 20 disposed within a distance of V ($\alpha_1$A+$\beta_1$) from a first impact imparting position 12-1 at which the first impact is imparted by the impact imparting unit 10. However, at a position spaced V ($\alpha_1$A+$\beta_1$) or more away from the sensor 20 (for example, a second impact imparting position 12-2 at which the impact imparting unit 10 imparts a second impact), even though the second impact is imparted at the same time as the first impact, elastic waves caused by the second impact cannot overlap the elastic waves caused by the first impact. Therefore, at a position spaced V ($\alpha_1$A+$\beta_1$) or more away from the sensor 20 reached by the elastic waves caused by the first impact, the impact imparting unit 10 does not necessarily have to satisfy the limit of Equation (1) described above. More preferably, at a position spaced V ($\alpha_4$A+$\beta_4$) or more away from the sensor 20 reached by the elastic waves caused by the first impact, even if the impact imparting unit 10 imparts a second impact at the same time as the first impact, it is possible to detect the elastic waves almost without overlapping between the elastic waves.

The arrangement of sensors 20 is restricted due to a condition for giving impacts 11. To properly evaluate the deterioration state of the structure 50 based on an elastic wave generation source distribution, unless the position of an elastic wave generation source can be determined throughout a measurement area, the distribution will have irregularity and this will lead to misdiagnosis. Elastic waves need to reach at least three sensors 20 and to be detected to determine the position of an elastic wave generation source. When the impact imparting unit 10 applies an impact 11 of an intensity such that it is detected with a sufficient large amplitude A in the sensor 20, if elastic waves caused by this impact 11 have an elastic wave velocity in the measurement object set as V, elastic waves caused by this impact 11 reach the sensor 20 at least approximately within a distance at which V [mm/ms] $D_{min}$ [ms] is V($\alpha_1$A+$\beta_1$) [mm] while maintaining an amplitude at which the impact 11 can be detected. Here, $D_{min}$ indicates the duration D on the straight line $l_1$ which takes the lower limit of the D-A distribution. Therefore, the farthest sensor 20 from the position of an elastic wave generation source, that is, a sensor 20 reached by the elastic waves third (third hit), needs to be disposed within a distance of $VD_{min}$ from the position of an elastic wave generation source. If a distance to the farthest sensor 20 is set to M, the arrangement of sensors 20 needs to satisfy Equation (2).

[Math. 2]

$$M \leq VD_{min} \tag{2}$$

Figure 6:
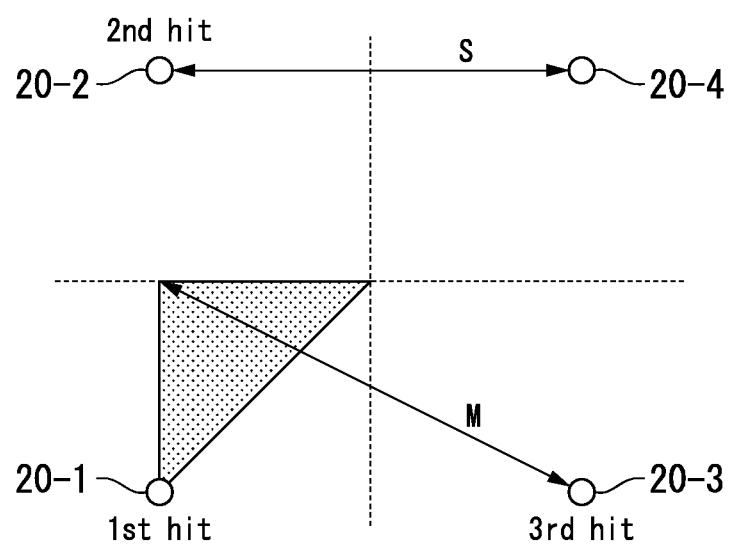
FIG. 6 is a diagram which shows an example of a sensor arrangement.

An example of the case in which the sensor arrangement is in a lattice form is shown in FIG. 6. When a lower right sensor 20-3 is set to be a third hit, the farthest distance is M in FIG. 6, and, if a sensor interval is set to be S, M is represented by Equation (3).

[Math. 3]

$$M = \sqrt{5}/2 \, S \tag{3}$$

Therefore, Equation (4) is obtained by substituting M and D into (2) in this example.

[Math. 4]

$$\sqrt{5}/2 \, S \leq V(\alpha_1 A + \beta_1) \tag{4}$$

According to Equation (4), a lower limit of the intensity of an impact 11 to be applied is defined based on a sensor interval, and an upper limit of the sensor interval is defined with respect to the intensity of an impact 11 to be applied inversely. More precisely, this can be incorporated in consideration of the thickness z of a slab. In this case, a distance M between an elastic wave generation source and a sensor is obtained by Equation (5) and expressed by Equation (6).

[Math. 5]

$$\sqrt{z^2 + 5/4 S^2} \tag{5}$$

[Math. 6]

$$\sqrt{z^2 + 5/4 S^2} \leq V(\alpha_1 A + \beta_1) \tag{6}$$

Figure 7:
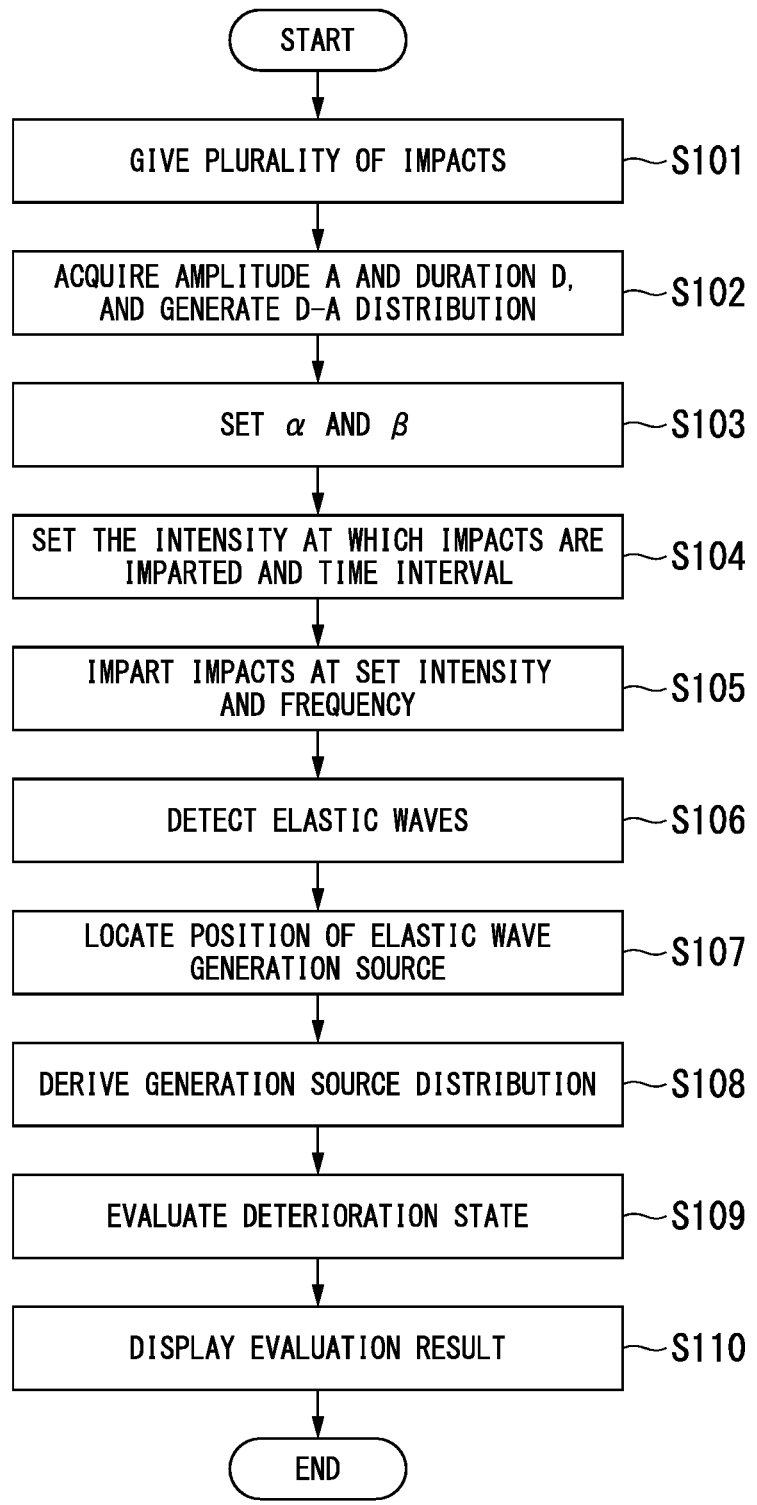
FIG. 7 is a flowchart which represents a flow of the evaluation processing of the structure evaluation system.

FIG. 7 is a flowchart which represents a flow of the evaluation processing of the structure evaluation system 100.

The impact imparting unit 10 applies a plurality of impacts 11 to the structure 50 for measurement (step S101). As a result, elastic waves are generated in the structure 50. The generated elastic waves are propagated through the structure 50 and detected by the sensors 20. The sensors 20 convert the detected elastic waves into an AE source signal which is a voltage signal, and outputs the AE source signal to the signal processor 30. The signal processor 30 receives the AE source signal output from the sensors 20 as an input. The signal processor 30 acquires an amplitude A and duration D from the input AE source signal. The signal processor 30 generates a D-A distribution which represents a relationship between the signal amplitude A [dB] and the duration D [ms] shown in FIG. 2 using the acquired amplitude A and duration D. (step S102)

The impact imparting unit 10 sets a reference straight line on the basis of the generated D-A distribution and sets an inclination α and an intercept β (step S103). The impact imparting unit 10 may acquire the D-A distribution generated by the signal processor 30 in any method. For example, the impact imparting unit 10 may acquire the D-A distribution generated by the signal processor 30 via an external medium, or acquire it by wired or wireless communication between the impact imparting unit 10 and the sensor 20.

The impact imparting unit 10 sets the intensity of impacts 11 applied to the structure 50 and a time interval at which impacts 11 are applied under a condition based on Equation (1) using the set inclination α and intercept β (step S104). Thereafter, the impact imparting unit 10 imparts impacts 11 to the structure 50 at the set intensity and time interval (step S105). The sensors 20 detect elastic waves generated in the structure (step S106). The sensors 20 convert the detected elastic waves into an AE source signal which is a voltage signal, and outputs the AE source signal to the signal processor 30.

The signal processor 30 receives the AE source signal output from the sensors 20 as an input. The signal processor 30 extracts an AE feature amount by performing necessary signal processing such as noise removal and parameter extraction on the input AE source signal. The signal processor 30 outputs information based on the extracted AE feature amount to the structure evaluation device 40 as an AE signal. The position locator 401 performs position location of an elastic wave generation source on the basis of the information of a sensor ID, an AE detection signal, and the like included in the input AE signal, and the sensor position information held in advance (step S107). Thereafter, the position locator 401 derives a generation source distribution using a result of the position location (step S108). The evaluator 402 evaluates the deterioration state of the structure 50 on the basis of the input generation source distribution (step S109). The display 403 displays a result of the evaluation according to control by the evaluator 402 (step S110).

According to the structure evaluation system 100 constituted as described above, the impact imparting unit 10 imparts impacts 11 to the structure 50 at the time interval determined in accordance with the intensity of the impacts 11 to be imparted by the impact imparting unit 10. The intensity of the impacts 11 imparted at this time is an intensity at which it is assumed that a small portion of elastic waves generated by a first impact 11 being applied are overlapped by elastic waves generated by a second impact 11 being applied. Therefore, the impact imparting unit 10 imparts impacts 11 to the structure 50 at a time interval determined based on the intensity, thereby allowing signals to be separated in the signal processor 30. As a result, it is possible to evaluate the deterioration state of a structure with higher accuracy using the structure evaluation device 40. As described above, the structure evaluation system 100 can efficiently perform measurement.

In addition, the impact imparting unit 10 imparts impacts 11 to the structure 50 at an intensity equal to or less than a certain intensity determined in accordance with a time interval at which the impacts 11 are imparted by the impact imparting unit 10 in the structure evaluation system 100. The time interval at which the impact imparting unit 10 imparts impacts 11 is a time interval presumed to have a low ratio at which elastic waves generated by a first impact 11 being applied overlap elastic waves generated by a second impact 11 being applied. Therefore, the impact imparting unit 10 imparts impacts 11 to the structure 50 at an intensity determined in accordance with the time interval, thereby allowing signals to be separated in the signal processor 30. As a result, it is possible to evaluate the deterioration state of a structure with higher accuracy using the structure evaluation device 40. As described above, the structure evaluation system 100 can efficiently perform measurement.

Hereinafter, a modification of the structure evaluation system 100 will be described.

Some or all of the functional units of the structure evaluation device 40 may be provided in different housings. For example, the structure evaluation device 40 may include only the evaluator 402, and the position locator 401 and the display 403 may be provided in different housings. With this configuration, the evaluator 402 acquires a generation source distribution from a different housing, and evaluates the soundness of a structure using the acquired generation source distribution. Then, the evaluator 402 outputs a result of the evaluation to the display 403 provided in a different housing.

By adopting such a configuration, it is possible to suppress the manufacturing costs of the structure evaluation device 40 by using an existing device to derive the generation source distribution.

The signal processor 30 may be included in the structure evaluation device 40. With such a configuration, the signal processor 30 acquires an AE source signal subjected to the processing performed by the sensor 20 from the sensor 20 directly or via a relay device which is not shown.

In FIG. 1, one signal processor 30 is connected to a plurality of sensors 20-1 to 10-n, but the structure evaluation system 100 may be configured to include a plurality of signal processor s 30 and a plurality of sensor units in which one signal processor 30 is connected to each sensor 20.

In addition, the evaluator 402 may operate as an output control unit. The output control unit controls an output unit and outputs an evaluation result. Here, the output unit includes the display 403, a communication unit, and a printing unit. When the output unit is a communication unit, the output control unit controls the communication unit and transmits an evaluation result to another device. Moreover, when the output unit is a printing unit, the output control unit controls the printing unit and prints an evaluation result. The structure evaluation device 40 may include some or all of the display 403, the communication unit, and the printing unit as an output unit and execute the operations described above.

In the present embodiment, a configuration in which the signal processor 30 generates a D-A distribution is shown, but the signal processor 30 does not necessarily have to generate a D-A distribution. For example, when there is a D-A distribution obtained with respect to a similar measurement object in advance, the impact imparting unit 10 may execute the processing of step S103 using this D-A distribution. With such a configuration, the processing of step S103 in FIG. 7 may not be executed.

According to at least one embodiment described above, the structure evaluation system includes the impact imparting unit 10 configured to apply an impact to a structure, the sensor 20 configured to detect elastic waves, and a structure evaluation device 40 configured to evaluate the deterioration state of a structure on the basis of the detected elastic waves, and the impact imparting unit 10 applies impacts at a frequency equal to or less than a frequency determined in accordance with an intensity at which impacts is imparted, thereby efficiently performing measurement.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A structure evaluation system comprising:
an impact imparting unit configured to apply impacts to a structure;
a plurality of sensors configured to detect elastic waves; and
a structure evaluation device configured to evaluate a deterioration state of the structure based on the detected elastic waves,
wherein the impact imparting unit applies the impacts at a first frequency equal to or less than a second frequency determined in accordance with an intensity at which the impacts are imparted and acquisition frequency of data, the acquisition frequency of data being obtained by multiplying a first curve representing a frequency of impact impartation and a second curve representing a proportion of separable elastic waves.

2. The structure evaluation system according to claim 1, wherein the plurality of sensors are arranged at intervals based on the impacts at the first frequency applied to the structure.

3. The structure evaluation system according to claim 1, the impacts are impacts given by at least one of spraying of water droplets, ice particles, or solid matter, hammering with a hammer, and by irradiating the structure with a laser and heating the structure.

4. A structure evaluation system comprising:
an impact imparting unit configured to apply impacts to a structure;
a plurality of sensors configured to detect elastic waves; and
a structure evaluation device configured to evaluate a deterioration state of the structure based on the detected elastic waves,
wherein the impact imparting unit applies the impacts at a first intensity equal to or less than a second intensity determined in accordance with a frequency at which the impacts are imparted and acquisition frequency of data, the acquisition frequency of data being obtained by multiplying a first curve representing a frequency of impact impartation and a second curve representing a proportion of separable elastic waves.

5. A structure evaluation system comprising:
an impact imparting unit configured to apply impacts that include at least a first impact and a second impact to a structure;
a plurality of sensors configured to detect elastic waves; and
a structure evaluation device configured to evaluate a deterioration state of the structure based on the detected elastic waves,
wherein the impact imparting unit applies the second impact to a position spaced a predetermined distance from at least one of the plurality of sensors that detects elastic waves caused by the first impact,
wherein the impact imparting unit applies the first impact and the second impact at a first intensity or a first frequency equal to or less than a second intensity or a second frequency determined based on an arrangement position of the plurality of sensors arranged in the structure and acquisition frequency of data, the acquisition frequency of data being obtained by multiplying a first curve representing a frequency of impact impartation and a second curve representing a proportion of separable elastic waves.

6. A structure evaluation method comprising:
giving impacts to a structure; and
evaluating a deterioration state of the structure based on elastic waves detected by a plurality of sensors that detect elastic waves,
wherein, the impacts to the structure are applied at a first frequency equal to or less than a second frequency determined in accordance with an intensity at which the impacts are imparted and acquisition frequency of data, the acquisition frequency of data being obtained by multiplying a first curve representing a frequency of impact impartation and a second curve representing a proportion of separable elastic waves.

7. The structure evaluation method according to claim 6, the impacts are impacts given by at least one of spraying of water droplets, ice particles, or solid matter, hammering with a hammer, and by irradiating the structure with a laser and heating the structure.

8. A structure evaluation method comprising:
giving impacts to a structure; and
evaluating a deterioration state of the structure based on elastic waves detected by a plurality of sensors that detect elastic waves,
wherein, the impacts to the structure are applied at a first intensity equal to or less than a second intensity determined in accordance with a frequency at which the impacts are imparted and acquisition frequency of data, the acquisition frequency of data being obtained by multiplying a first curve representing a frequency of impact impartation and a second curve representing a proportion of separable elastic waves.

9. A structure evaluation method comprising:
giving impacts that include at least a first impact and a second impact to a structure; and
evaluating a deterioration state of the structure based on elastic waves detected by a plurality of sensors that detect elastic waves,
wherein the giving impacts includes applying the second impact to a position spaced a predetermined distance from at least one of the plurality of sensors that detects elastic waves caused by the first impact, and
wherein the giving impacts includes applying the impacts at a first intensity or a first frequency equal to or less than a second intensity or a second frequency determined based on an arrangement position of the plurality of sensors arranged in the structure and acquisition frequency of data, the acquisition frequency of data being obtained by multiplying a first curve representing a frequency of impact impartation and a second curve representing a proportion of separable elastic waves.

10. An impact imparting apparatus used for evaluation of a structure using a plurality of sensors that detect elastic waves, the impact imparting apparatus comprising:
an impact imparting unit configured to apply impacts to the structure to generate the elastic waves; and
wherein the impact imparting unit applies the impacts at a first frequency equal to or less than a second frequency determined in accordance with an intensity at which the impacts are imparted and acquisition frequency of data, the acquisition frequency of data being obtained by multiplying a first curve representing a frequency of impact impartation and a second curve representing a proportion of separable elastic waves.

11. The structure evaluation apparatus according to claim 10,
the impacts are impacts given by at least one of spraying of water droplets, ice particles, or solid matter, hammering with a hammer, and by irradiating the structure with a laser and heating the structure.

12. An impact imparting apparatus used for evaluation of a structure using a plurality of sensors that detect elastic waves, the impact imparting apparatus comprising:
an impact imparting unit configured to apply impacts to the structure to generate the elastic waves; and
wherein the impact imparting unit applies the impacts at a first intensity equal to or less than a second intensity determined in accordance with a frequency at which the impacts are imparted and acquisition frequency of data, the acquisition frequency of data being obtained by multiplying a first curve representing a frequency of impact impartation and a second curve representing a proportion of separable elastic waves.

13. An impact imparting apparatus used for evaluation of a structure using a plurality of sensors that detect elastic waves, the impact imparting apparatus comprising:
an impact imparting unit configured to apply impacts to the structure to generate the elastic waves; and
wherein the impact imparting unit applies a second impact to a position spaced a predetermined distance from at least one of the plurality of sensors that detects elastic waves caused by a first impact, and
wherein the impact imparting unit applies the first impact and the second impact at a first intensity or a first frequency equal to or less than a second intensity or a second frequency determined based on an arrangement position of the plurality of sensors arranged in the structure and acquisition frequency of data, the acquisition frequency of data being obtained by multiplying a first curve representing a frequency of impact impartation and a second curve representing a proportion of separable elastic waves.

\* \* \* \* \*